3,609,814
ROTATIONAL CASTING MACHINE FOR
THERMOPLASTIC BODIES
Anton J. Vox, Ruit, and Adolf Bauer, Stuttgart-Bad
Cannstatt, Germany, assignors to Firma Thermovox
GmbH Kunststoffmaschinen, Ruit, Germany
Filed June 20, 1969, Ser. No. 835,178
Claims priority, application Germany, June 27, 1968,
P 17 79 001.1
Int. Cl. B29c 5/04
U.S. Cl. 18—26 RR     7 Claims

ABSTRACT OF THE DISCLOSURE

A rotational casting machine for the production of thermoplastic bodies having an angularly oscillatable or rotatable frame carrying a plurality of mold turntables at a location offset from the axis of angular displacement of the frame. The turntables, each of which can carry one or more molds, are provided with ducts for feeding a heating medium and/or a cooling medium to the molds in series, in parallel or individually.

---

Our present invention relates to rotational casting machines and, more particularly, to apparatus for the rotational casting of thermoplastic bodies of various shapes and sizes.

It has been proposed heretofore to provide rotational casting arrangements in which a mold is rotatable about an axis and the entire system is angularly displaceable, e.g. in oscillation or rotation, to distribute a thermoplastic material more or less uniformly along the inner wall of the mold so that, upon subsequent cooling, the thermoplastic material solidifies to produce the body.

The basic principle of this casting method is that the angular displacement and rotational movement about two mutually perpendicular axes serves to distribute a thermoplastic material along the walls of the mold when the thermoplastic material is rendered flowable by applied heat. The synthetic resin can be introduced into the mold in the form of a powder, paste or as granules, the synthetic resin being transformed into a more or less flowable liquid by the application of heat so that the resulting layer is substantially homogeneous. The resulting hollow bodies, which may have open or closed shapes, can be receptacles for the transport and storage of fluids and are removed from the mold when the latter is opened after termination of angular displacement or after removal of the mold from the machine and its replacement by another mold to repeat the process.

As will become apparent hereinafter, two basic operating principles are used in connection with this type of system. In one of these techniques, heating is effected externally by passing the mold through an oven or heating chamber, followed by a cooling chamber in the path of the mold. Finally, the mold emerges from the chambers and discharge of the finished article is possible. In the other basic system, hollow-wall or so-called "double-wall" molds are employed and heating and cooling fluids are delivered to the interwall space of the mold to heat and cool the interior thereof directly.

For example, in the commonly owned application Ser. No. 804,224, filed Mar. 4, 1969 by Anton Johannes Vox, one of the present joint applicants, there is described an apparatus for the rotary casting of thermally flowable synthetic resin material which makes use of a drum-type mold carrier rotatable about a horizontal axis and having molds angularly spaced and circumferentially distributed therearound. The drum carrier cooperates with a housing subtending part of the periphery of the mold carrier and defining along the path of the latter, in the direction of rotation thereof, a heating chamber in which the thermoplastic material is brought to its flow temperature, and a cooling chamber in which the temperature is reduced to set the thermoplastic material.

In the chambers, the individual molds are rotatable about at least one axis (transverse to the axis of rotation of the drum) by a drive means which is advantageously independent of the drive means rotating the mold carrier. The latter is intermittently, preferably periodically, rotated or stepped to advance successive sectors of the mold carrier through the successive chambers to finally carry the molds out from the housing into a region into the cast bodies can be removed either while leaving the molds in place or by removing the molds and replacing them with molds freshly charged with the synthetic-resin material. The heating chamber subtends one or more of these sectors while the cooling chamber subtends at least one sector and the periodic drive is so constructed and arranged as to step the mold carrier angularly about its horizontal axis through a stroke corresponding to one sector. The interior of the heating chamber may be subdivided by a partition which, like the partition between the heating and cooling chambers, is thermally insulating so that a plurality of heating chambers, each extending over the full circumferential extent of a sector, is formed.

The sectors are also advantageously subdivided on the mold carrier by radially and preferably diametrically extending partitions of thermally insulating material. When four such partitions are provided, they are respectively alignable with the generally radial external partitions of the housing means when the carrier is immobilized after each cycle of angular advance. The carrier is provided with mold-supporting frames for each of the sectors, the frames each having a plurality of axially spaced molds which are rotatably mounted so as to spin about respective mold axes perpendicular to the horizontal axis of rotation of the drum. The frames themselves may be rotatable or swingable about respective horizontal axes parallel to the axis of rotation of the drum, thereby permitting the molds to rotate about two mutually perpendicular axes independently of the drum.

In the commonly owned application Ser. No. 807,812, filed Mar. 17, 1969, entitled "Rotational Casting Apparatus" and filed by Anton Johannes Vox, there is described a system having a special utility in the formation of relatively large hollow bodies by rotational casting techniques, such bodies having, for example, a capacity of the order of several thousand liters. That apparatus has a mold rotatable about two mutually transverse axes, respective drive means in the form of reversible hydraulic motors for rotating the mold about each of these axes and control means for the hydraulic motors for rocking the mold about at least one of these axes. By contrast with the system described in application Ser. No. 804,224, the mold of the later application is of the double-wall type to which a heating and a cooling fluid medium can be fed to liquefy the resin and promote solidification during rocking action. The control means is arranged to rock or angularly oscillate the mold about one axis as noted above while the mold rotates about the other or while the mold is prevented from rotating about the other axis. Such a rocking or oscillating movement builds up the coating of the thermoplastic material at one location in the mold so that the cast body can be proportionately thicker there. Heating and cooling fluids are delivered to the mold through the turntable which is carried, according to the system of application Ser. No. 807,812, on a crank arrangement in which the support frame lies parallel to a horizontal axis of rotation of this frame but is offset laterally thereof in a crank-like configuration, the mold and turntable having an axis lying in a plane which includes the axis of the crank and being received on the frame between a pair of shaft members on either end of this frame but spaced apart between them to accommodate the molds.

Prior to the systems described in the aforementioned applications, and even to some extent in such systems, it has been necessary to provide a number of rotational casting machines dimensioned to suit the dimensions of the desired product. This problem is particularly acute when rotational casting of bodies with a volume of say 1 liter to say 10,000 liters is desired. In most cases, it is difficult, if not impossible, to exchange the molds used for formation of bodies with a capacity of several thousand liters for molds employed in the production of bodies of several liters in capacity. Furthermore, the production rates of the prior art machines are limited and optimal use of such machines is possible only when molds of a particular size and configuration are employed.

It is, therefore, the principal object of the present invention to provide a rotational casting apparatus or machine for the production of hollow bodies of open or closed configuration, in which the aforementioned disadvantages are eliminated.

Still another object of our invention is the provision of a rotational casting system capable of being used efficiently for the production of bodies of various volumes, shapes and character without materially reducing molding efficiency.

A further object of the instant invention is the provision of a rotational casting machine or apparatus which extends the principles set forth in the aforementioned copending applications to high-rate machines for the formation of bodies of selected dimensions.

It is still another object of this invention to provide an improved apparatus for the rotational casting of noncircular bodies and bodies of configuration differing from those of a body of revolution.

These objects and others which will become apparent are attained, in accordance with the present invention, in a rotational casting machine having a crank-like frame swingable about an axis offset from the supporting members of the frames, but parallel thereto, and a plurality of mold-receiving turntables or rotary platforms mounted on the frame and coupled for joint rotation about axes parallel to one another but perpendicular to the axis of angular displacement of the oscillatory or rotatable frame.

According to an important aspect of this invention, double-wall molds of the type described in application Ser. No. 807,812 are employed in the system of the present invention and heating and cooling fluids are delivered to the interwall space of these molds by fluid ducts provided in the turntable and connectable with or registering with the molds removably mounted thereon. Preferably, the turntables are provided with a number of spaced apart fittings for supplying the fluids to registering mold openings, each of the fittings cooperating with a respective mold when, in accordance with the feature of this invention, each turntable is provided with a plurality of molds.

In accordance with another aspect of this invention, the turntables are coupled together for joint rotation independently of the oscillation of the frame, but are journaled in a frame section parallel to the axis of angular oscillation of the frame, but offset therefrom. The heating and cooling media may be supplied to the turntables through the hollow shafts supporting this frame and/or the hollow shafts on which the turntables are mounted. At least two turntables are provided according to the instant invention and are spaced along the eccentric central section of the crank and can carry one or more interchangeable or replaceable molds in which a thermoplastic material can be uniformly spread over the inner wall of the mold by rotation of the turntable and angular oscillation of the frame. The heating and/or cooling medium can be supplied to the molds of each turntable and/or to the molds of both turntables in series, in parallel or with individual control of both volume and temperature from a single heating and cooling assembly or from the individual heating and cooling units so that similar temperatures can be maintained in the molds at a given time or the temperatures of each mold can be controlled individually.

According to a further feature of the instant invention, at least a part of the multiplicity of turntables is drivable independently from the remaining turntables while the drive is effected for each set of turntables through a respective hollow shaft at each end of the eccentric frame. Moreover, at the upper mold-supporting faces, the turntables each may be provided with a multiplicity of connecting formations for the heating and cooling ducts of the mold.

The afore-described apparatus has the important advantage that it makes it possible to mount either a single relatively large mold, for the formation of receptacles with a capacity of thousands of liters, upon each turntable or to mount a plurality of molds, each with the same or a different capacity product.

In a preferred embodiment, the rotational casting apparatus of the invention makes use of three rotary turntables disposed one next to the other and of a diameter corresponding approximately to the median diameter of the molds to be carried thereby. The turntables are coplanar so that, when a body of a diameter larger than this median diameter is to be made, a spacer plate can be inserted between the turntable and the central mold such that the mold overhangs in part the turntables on either side of the turntable carrying the mold. To the extent that the flanking turntables clear the large-capacity mold, they may be provided with relatively smaller molds to form bodies of corresponding capacity. When only small bodies are to be made in the machine, a number of molds corresponding to the number of fluid connections provided on the turntable can be mounted on the latter, while adapter plates may be provided between the molds and the turntable to form the necessary number of connecting formations. A machine of this type is capable of producing relatively large and relatively small hollow bodies, rapidly and economically, and in practice, it has been found to be possible to produce a full range of rotationally cast thermoplastic receptacles with a capacity between 1 and 10,000 liters, using two machines, whereas at least six machines were required for prior-art techniques.

According to another aspect of this invention, a plurality of turntables, each of which preferably is designed to accommodate but a single mold during rotational casting operations, are provided upon the support frame between the members from which this frame is suspended between the shafts on opposite sides thereof. A large number of such turntables can be provided, each with only one connection for the heating and cooling media, thereby producing a large number of relatively small bodies. Even bodies of larger dimensions, say in the intermediate range, can be produced in this system since overhanging molds may be provided on several turntables. The system nevertheless can be constituted as a robust apparatus and is capable of affording control of the heating and cooling media as described earlier.

Preferably, the turntables are arrayed in a ring, i.e. constitute an annular array surrounding a common central axis lying in a plane including the oscillatory axis of the support frame, the turntables of the array being angularly equispaced about this axis.

Moreover, a central turntable is also provided in accordance with this invention and may be of a diameter larger than the diameters of the turntables of the annular array. The turntables are mechanically coupled together, e.g. by gearing or a chain, and are driven in accordance with the invention by power tapped through one of the hollow shafts supporting the frame. This hollow shaft or the opposite hollow shaft may serve to supply the heating and the cooling media to the turntables. This arrangement has been found to be particularly satisfactory in the production of relatively large bodies in molds on the central turntables which may overhang all or part of the turntables of the circular array.

The arrangement of the turntables in the aforedescribed manner facilitates the drive of the individual turntables and the entire assemblies. In accordance with one feature of this invention, all of the rotary plates or turntables of the annular array are driven by a common endless drive member, e.g. a chain or belt. In another modification of this arrangement, all of the turntables are coupled, e.g. via a central drive shaft which may simultaneously constitute the shaft of the central turntable or is coaxial therewith. The latter arrangements have been found to be particularly satisfactory when the turntables are to be driven at identical rates for the manufacture of similar articles in similar molds of each turntable.

The above and other objects, features and advantages of the present invention will become more readily apparent from the following description, reference being made to the accompanying drawing in which.

Figure 1:
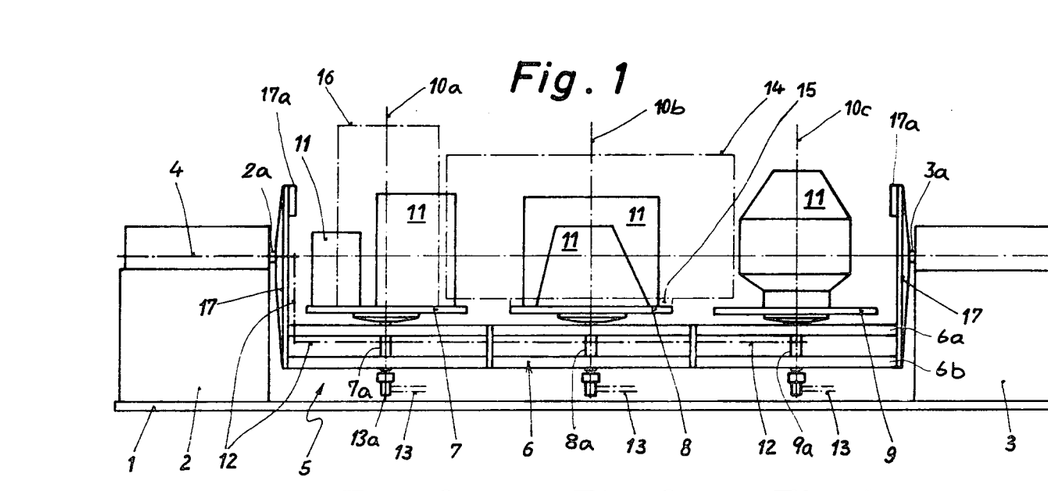
FIG. 1 is an elevational view, partly in diagrammatic form, of an apparatus for rotational casting using three turntables, in accordance with the present invention.

In FIG. 1, we show a rotational casting machine in diagrammatic form, the machine being generally of the type described in connection with application Ser. No. 807,812 identified above.

Figure 1A:
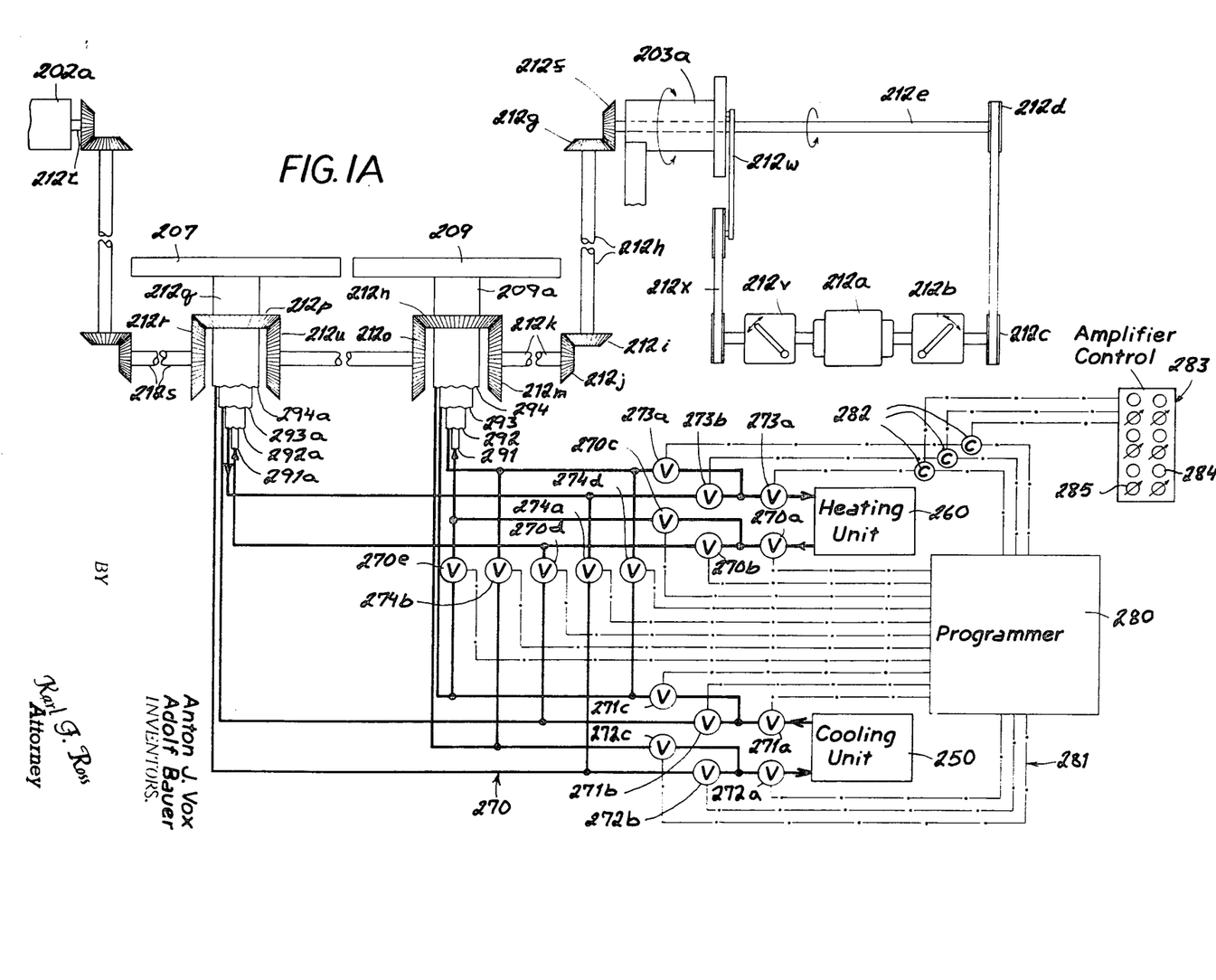
FIG. 1A is a diagram of the drive and fluid control systems for a similar rotational casting machine.

The base 1 of the machine carries left- and right-hand journaled housings 2 and 3 in which the hollow support shafts 2a and 3a are journaled and are driven as described in the last-mentioned application or as shown in FIG. 1A. The shafts 2a, 3a are rotatable about a horizontal axis 4 and carry an eccentric frame 6, 17 in the form of a crankshaft arrangement or cradle generally represented at 5. In the central region 6 of this eccentric or cradle, three mold-carrying turntables 7, 8 and 9 are journaled in succession (from left to right) about axes 10a, 10b and 10c coplanar with one another and with the axis 4 and represented in a vertical position in FIG. 1.

The turntables or rotary platform 7, 8 and 9 are carried by shafts 7a, 8a and 9a journaled in the support structure 6a, 6b of the central eccentric portion 6 of the crank. The supports 6a and 6b are, in turn, anchored to arms 17 carried by the shafts 2a and 3a and provided with counterweights 17a. A drive 12 serves to rotate the turntables 7-9 about the axes 10a-10c and derives its power from a motor in the left-hand bearing housing 2 via the hollow shaft 2a. A similar drive may be provided in the right-hand bearing housing 3 when separate drive of one or more of the turntables 9, for example, is desired.

In the embodiment shown in FIG. 1, the drive assembly for the crankshaft 5 and the turntables 7-9 is provided in the bearing housing 2 while the right-hand bearing housing 3 is formed with the cooling and heating installation serving to heat and cool the individual molds 11 carried by the turntables 7-9.

As can be seen in FIGS. 1-4, each turntable may carry a number of individual molds, the molds being of the double-wall, fluid-heated and fluid-cooled type. The drive arrangement 12 for the turntables 7-9 can consist of gear wheel and connecting shafts as described for example in application Ser. No. 807,812. In a modification of this arrangement, the turntables 7 and 8 may be operated by the drive 12 while turntable 9 may be coupled to a separate drive (see FIG. 1A) extending through the tubular shaft 3a and rotating this turntable about its axis 10c independently of the rotation of the turntables 7 and 8. In this case, the bearing housing 3 is provided with an auxiliary drive.

Referring now to FIG. 1A in which a drive for the turntables 207 and 209 (corresponding to the turntables 7 and 9 of FIG. 1) is shown in greater detail, it can be seen that a motor 212a is provided with a variable speed transmission 212b whose output pulley 212c is connected to the driven pulley 212d of a shaft 212e extending coaxially through the hollow shaft 203a for oscillating the frame 6, 17 supporting the turntables 207, 209 as described in connection with FIG. 1.

At its inner end, the shaft 212e is formed with a bevel gear 212f which meshes with a bevel gear 212g of a vertical shaft 212h journaled on the oscillatable support (e.g. 5 as in FIG. 1). A bevel gear 212i of shaft 212h meshes with the gear 212j of a horizontal shaft 212k which, in turn, bears a gear 212m engaging the driven gear 212n mounted upon the shaft 209a of turntable 209. A further bevel gear 212o in mesh with gear 212n can connect this drive to further turntables.

Driven independently of the turntable 209 is the turntable 207 whose bevel gear 212p is mounted upon the shaft 212g and is driven by a gear 212r of a shaft 212s. The latter is, in turn, rotated by a shaft 212t extending coaxially through the oscillatory support shaft 202a as described in connection with the drive for turntable 209. A bevel gear arrangement 212u may be provided to connect the left-hand drive with a turntable corresponding to the turntable 8 of FIG. 1 as previously described.

Transmission 212v of the motor 212a is connected to a crank arrangement 212a by a belt drive 212x to oscillate the support frame (e.g. 6, 17) via the shaft 203a or 202a. Thus the degree of oscillation and the rotation rate can be controlled with ease. In place of this mechanical drive, the hydraulic drive of application Ser. No. 807,812 may be employed.

Reverting to FIGS. 1-4, it can be seen that the turntables 7-9 are provided along their upper mold-receiving surfaces with several connecting formations, angularly spaced about the respective axes 10a, 10b and 10c, serving to supply the heating and cooling media to the interwall spaces of the mold and to return these fluids to the heating and cooling installation which may be of the type shown in FIG. 1A. The connecting formations on the turntables are so arranged that it is possible to provide several forms of molds 11 at predetermined groupings upon each plate so that the heating and cooling media flow through these molds. Each of the turntables is provided with ducts adapted to conduct the heating and cooling media to and from the turntables as represented diagrammatically (dot-dash lines) at 13 in FIG. 1. The ducts 13 are connected with fluid distributor of conventional construction 13a to permit rotation of the turntable shafts and yet allow fluid communication with the hollow shafts of these turntables.

As noted earlier, the molds on each of the turntables can be connected in parallel or in series with one another and in parallel or in series with the molds of another turntable of the rotational casting machine, and with the heating and cooling installation mentioned earlier. It is also possible to provide a separate heating and cooling installation for each of the turntables or for a selected number of the turntables, while the remaining turntables to another heating and cooling installation. The arrangement preferably is so carried out that at least one of the turntables can be heated and cooled independently of the remainder. For common heating and cooling of the turntables and the molds carried thereby, the parallel or series connections can be used although a series connection provides a substantial temperature drop from one mold to the other. Even this temperature drop can be exploited, however, when it is desired to operate several molds of the machine at different temperatures. With a parallel arrangement of the heating and cooling fluid streams, the temperature control can be carried out by timing the flow of the fluids through the respective molds. The individually adjustable heating and cooling system is desirable when for example a relatively thick body is to be made and relatively long heating and cooling times are desired.

Referring again to FIG. 1A, it can be seen that the heating-and-cooling installation may comprise a refrigerating unit 250 and a heating unit 260 for respectively delivering a heating fluid or a cooling fluid to a duct network which is represented for the sake of simplicity at 270 for two turntables. The output side of the heating unit 260 is a duct 261 connected by valves 270a, 270e to the turntables 207, 209 while other valves 271a–271c control the flow from the cooling unit while valves 272a–272c, 273a–273c and 274a and 274b control switch-over of fluid streams and the return flows to the heating and cooling units. Each of these valves is electrically controlled by a programmer 280 as represented by the dot-dash lines 281 while the rate of flow through the ducts is regulated by controllers 282 operated from a panel 283 whose gauges 284 show the temperatures in the various molds and which has dials 285 for setting the desired temperatures (see application Ser. No. 807,812). As is also apparent from this figure, the hollow shafts 209a and 212g of the turntables are constituted by coaxial shaft members into which the several fluids may be fed as represented, for example, at 291, 292, 293 and 294 for the shaft 209a. The corresponding ducts of shaft 212g are shown at 291a–294a.

Figure 1B:
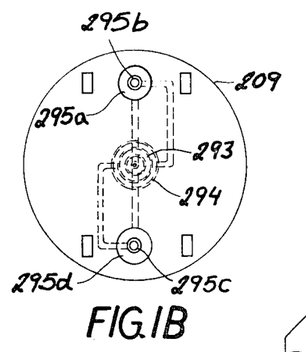
FIG. 1B is a plan view of a turntable provided with two connections adapted to register with respective molds on a single turntable.
Figure 1C:
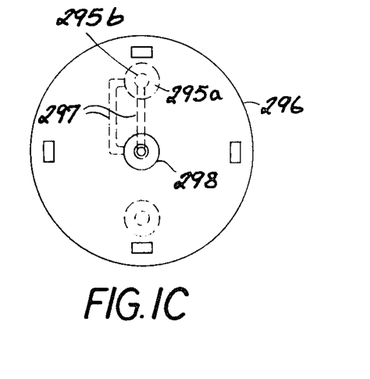
FIG. 1C is a plan view of an adapter plate to accommodate the turntable of FIG. 1B to a single mold.
Figure 2:
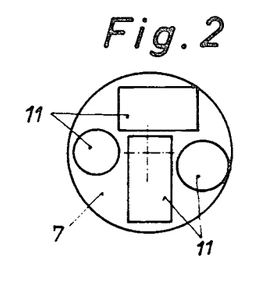
FIGS. 2-4 are plan views of three turntables carrying various numbers of molds of different configurations.
Figures 3, 4:
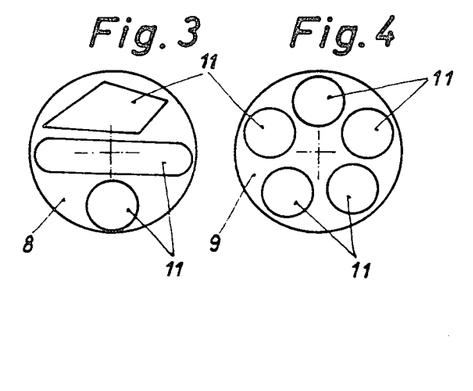

As can be seen in FIG. 1B, the top of each turntable, e.g. the turntable 209, is formed with connecting formations 295a and 295b respectively communicating with ducts 294 and 293 and with formations 295c and 295d respectively communicating with the ducts 292 and 291. Individual molds may be positioned as shown at 11 in FIG. 1 in registry with the formations 295a, 295b, 295c and 295d for individual flow of the fluid media through the molds in series or in parallel or with individual control as will be apparent hereinafter. When a single mold is provided, the plate 296 of FIG. 1C may be placed upon the turntable 109 such that formations 295c and 295d are blocked while the formations 295a and 295b communicate with a network 297 in the plate 296, running to a central formation 298 for supplying the single mold with heating and cooling fluid.

To heat the molds of turntable 209 in parallel, valves 270a, 270b, 270c, 270e and valves 274b, 273c, 273a are opened and the remaining valves associated with the turntable 209 are closed. Hence the heating fluid flows from line 261 in through ducts 291 and 293 and out through ducts 292 and 294 to a mold in a parallel flow. When a series flow through the molds is desired, valves 270a, 270c, 274b, 274d are opened and the remaining valves associated with turntable 209 are closed. For individual control of, say the mold, associated with the fittings 295a, 295b, only valves 270a, 270c, 273c and 273a are operative while the remaining valves of this turntable are closed. The system also provides the possibility of a series connection between any of the molds on turntable 209 or both of the molds in parallel, and any other molds or turntables 207 or any of these molds in parallel.

The system of FIGS. 1–4 admits of modificatons in other respects as well. For example, the central turntable 8 shown in FIG. 1 may be surmounted by a relatively large mold 14 which is seated upon an intermediate plate 15, e.g. of the type shown at 296 in FIG. 1C, so that plates 7 and 9 do not interfere with rotation of the mold about the axis 10b. In this case, the mold 14 may overhang at least part of the turntables 7 and 9. In the event that the mold overhangs only a part of each of these turntables, the remaining part may be used to receive a smaller mold such as is shown in dot-dash line 16 for the left-hand turntable 7.

Figure 5:
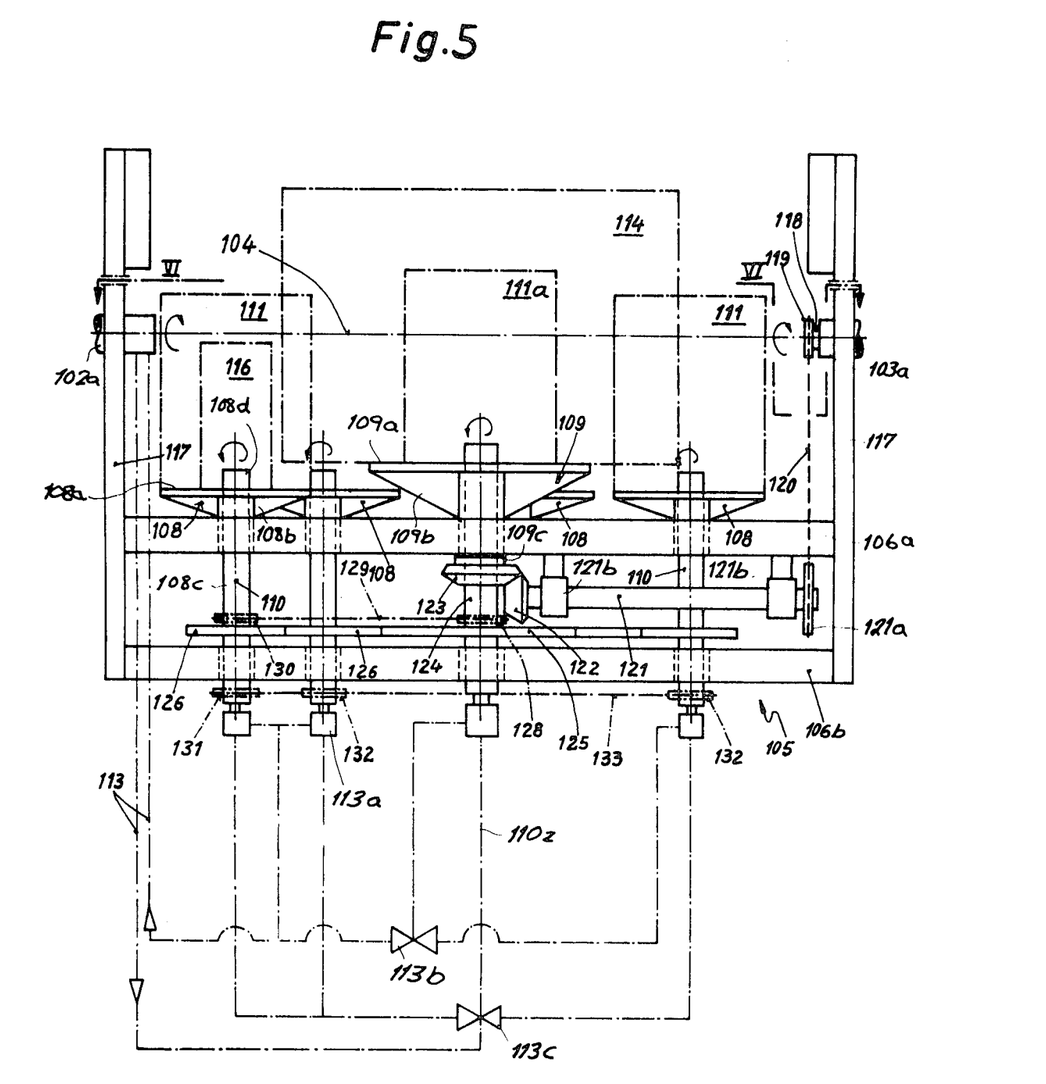
FIG. 5 is an elevational view, also in diagrammatic form, wherein the turntables are disposed in a circular array in accordance with another aspect of this invention.
Figure 6:
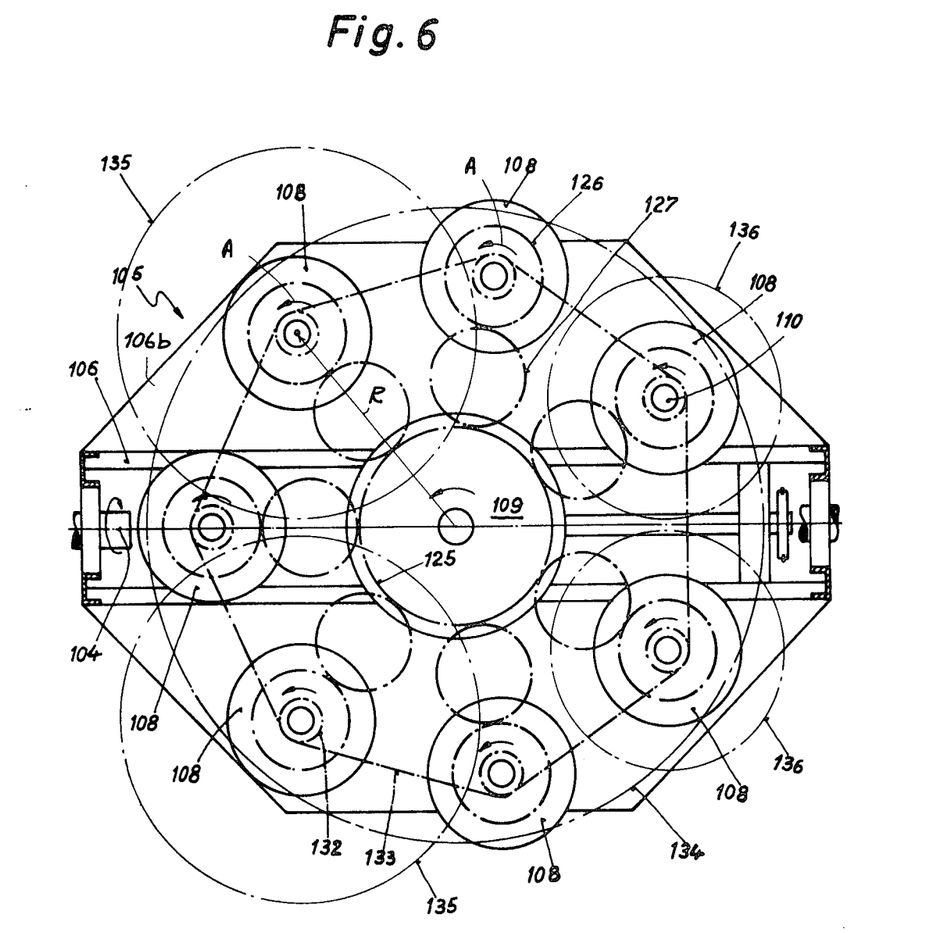
FIG. 6 is a plan view of this arrangement.

In FIGS. 5 and 6, we show a modified arrangement, in accordance with the invention, wherein a pair of hollow shafts 102a and 103a, journaled in bearing housings of the type shown at 2 and 3 in FIG. 1, carry the arms 117 upon which the frames 106a and 106b of the crankshaft arrangement 105 are mounted. In this embodiment, however, member 106b is generally octagonal and the turntables 108 are mounted thereon in a circular array of angularly equispaced members surrounding the central axis 110z so that the individual axes 110 of these turntables which run perpendicular to the planes of the frame members 106a and 106b, lie at identical radial distances R from the center 110z. Each turntable or plate 108 has a mold-receiving surface 108a and a frustoconical base 108b affixed to a shaft 108c centered on the corresponding axis 110 and journaled in the frame members 106a, 106b. As described in connection with FIG. 1, the double-wall molds 111, which communicate with the ducts and fittings for fluid communication to these molds as described in connection with FIG. 1, are interchangeably and replaceably mounted. In this embodiment the double-wall molds 111 are directly heated and cooled by the passage of a heating medium or a cooling medium through the interwall space.

The arrangement comprises seven such turntables 108 which are of a relatively small diameter and surround a central turntable 109 whose upper surface 109a is likewise adapted to receive a mold as represented at 111a or 114. The turntable or platform 109a, whose frustoconical base 109b is fixed to a shaft 109c carrying the bevel gear 123, is of a larger diameter than the turntables 108. The surface 109a lies above the plane of the surfaces 108a of the circular array of turntables 108 so that a larger-diameter mold 114 may be mounted upon the central turntable and can overhang some or all of the outer turntables 108. The turntables are arranged in the eccentric intermediate section of the crankshaft 105 such that the molds 111 between the crank arms 117 are spread along the gap between these arms such that the forms or molds can be rotated about their axes which may be closed to or offset from the oscillating axis 104 of the crank arrangement. When a large mold such as that shown at 114 is employed, small molds may be provided as shown at 116 on the outlying rotary platforms 108.

In the right-hand bearing housing, not seen in FIG. 6, we provide a drive assembly for the crankshaft 105 and for the rotatable platforms 108, 109 which operates through the hollow shaft 103a. To this end, a shaft 118, analogous to the shaft 212e of FIG. 1A, extends from shaft 103a and is provided with a driving sprocket 119 connected by a chain 120 to the driven sprocket 121a, the latter is mounted upon a power transmission shaft 121 rotatable in journal blocks 121b depending from the frame 106a and carrying bevel gear 122 in mesh with the bevel gear 123 driving the shaft 109c of the central rotary platform 109. The bevel gear 123 is also fixed to a shaft 124 carrying the sprocket 128 which is coupled via an endless chain 129 with a sprocket 130 affixed to the left-hand rotary platform 108 at its shaft 108c (see FIG. 5).

Sprocket wheels 131, 132, etc. on the shaft of each of the rotary platforms 108 are interconnected by a chain 133 extending around the array as shown in FIG. 6 to drive the platforms in the same sense and at the same rate as represented by the arrows A. In place of the coplanar wheels 131, 132 and chain 133, each of the rotary platforms 108 may be provided with a driven gear 126 in mesh with an intermediate gear 127 constituting an idler journaled on the frame member 106b, and meshing with a planetary gear 125 of the shaft 124 as shown in dot-dash lines in FIG. 6. However, it is also possible to provide an individual drive for the central platform 109 (e.g. via the hollow shaft 102a and an auxiliary motor in the left-hand bearing housing, while the bevel gear 122 merely rotates gear 125 independently of the shaft 124.

It is possible, in accordance with the present invention, to provide a single connecting fitting (e.g. at 108d) for each of the rotary platforms to communicate with the respective molds or to provide a plurality of such fittings as described in connection with FIGS. 1B, 1C and 2-4. In either case, the shafts 124, 108c, etc. of the rotary platforms are hollow and communicate with distributors 113a for delivery of the heating and cooling fluids to the platforms in parallel or in series as previously described. The network 113 permits parallel flow of fluids from the heat and cooling installation communicating therewith through the hollow shaft 102a and located in the left-hand bearing housing of the apparatus. Valves 113b and 113c permit selective control of the fluid flow through for example the central rotary platform and/or one or more of the outer platforms 108.

At 134 in FIG. 6, we have shown the outlines of a large mold which can be mounted upon the central rotating platform 109 and which overhangs all of the outer platforms 108. In this case only a single mold is employed. To demonstrate the facility of the machine, moreover, we show at 135 two molds of intermediate sizes which partly overhang adjacent turntables and the central turntable as well as somewhat smaller molds 136 which do not overhang adjacent turntables. Whenever required, of course, intermediate members such as that shown in FIG. 1C may be provided.

Figure 7:
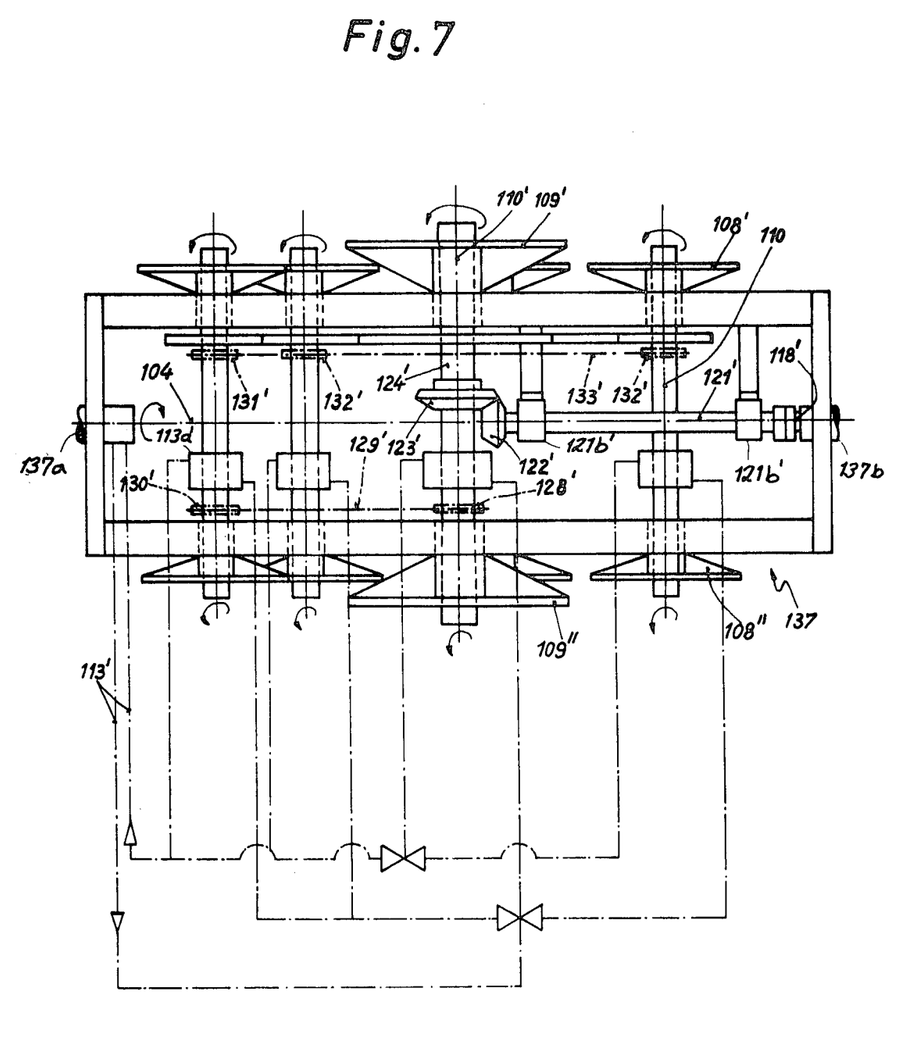
FIG. 7 is a view similar to FIG. 5, illustrating another embodiment of the invention.

In the embodiment illustrated in FIG. 7, the crankshaft is replaced by a rotary drum arrangement of the type described, for example, in the earliest of the above-mentioned copending applications, and which comprises a support frame 137 carried by a pair of shafts 137a and 137b through which fluid is communicated to the rotary platforms and the latter are driven. To this end, the central shaft 118′, 121′ mounted in bearing blocks 121b′ carries a bevel gear 122′ in mesh with the central bevel gear 123′ on shaft 124′ of the rotary platform 109′. A sprocket gear arrangement 128′-130′ serves to transmit motion to the outer array of platforms 108′ while the sprocket and chain arrangement 131′-133′ couples all of the outer platforms for joint rotation. Here two arrays of platforms are provided at 108′, 109′ and 108″, 109″ for rotation about respective axes 110′ while fluid is fed through the hollow shaft 137a as represented at 113′ via distributors 113a′. This arrangement, wherein two arrays of turntables are provided on opposite sides of the axis of the drum, permits direct heating and cooling by fluid flow through the molds to be avoided since the molds can be brought into heating and cooling housings and removed therefrom by rotation of the drum as described in connection with application Ser. No. 804,224.

Figure 8:
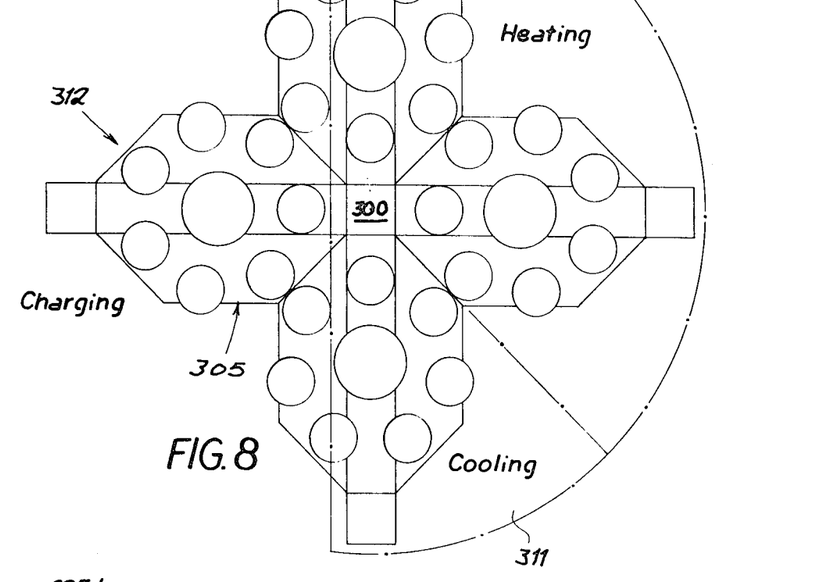
FIG. 8 shows another system for the heating and cooling of the molds of the present invention.

In FIG. 8, I have shown another system wherein circular arrays of turntables as shown in FIGS. 5-7 are mounted upon a rotatable bearing housing 300 and are represented at 305, these arrays being swung through a heating oven 310 and a cooling chamber 311 prior to leaving the housing at the charging and discharging step 312.

We claim:
1. A rotational casting machine, comprising:
an angularly oscillatable support frame swingable about a first axis and having the configuration of a cradle with an eccentric portion offset from said axis but parallel thereto;
first drive means for angularly displacing said frame about said axis;
a plurality of rotary mold-receiving platforms journaled on said portion of said support frame for rotation about respective second axes parallel to one another but transverse to said first axis, said platforms each having a mold-receiving surface for accommodating molds of various sizes thereon;
second drive means for rotating said platforms about the respective second axes;
duct means terminating at said surfaces for feeding heating and cooling fluids to respective molds mounted upon said surfaces;
fluid control means for delivering said fluids selectively to the molds of each platform in series and in parallel and for selectively delivering said fluids to the molds of the different platforms in series and in parallel; and
auxiliary drive means connected to at least one of said rotary platforms for rotating same independently of said second drive means about the second axis of said one of said platforms.

2. The machine defined in claim 1 wherein each of said platforms is formed with a plurality of formations adapted to register with the respective molds, each of said platforms further comprising a hollow shaft centered upon the respective second axis, said duct means including a duct extending through each of said hollow shafts and communicating with the respective mold at the respective formation.

3. The machine defined in claim 1 wherein said support frame is provided with a pair of hollow shafts carrying said frame on opposite sides of said eccentric portion and aligned along said first axis, said second drive means and said auxiliary drive means each including a drive member extending through one of said hollow shafts.

4. The machine defined in claim 1 wherein said rotary mold-receiving platforms are disposed in a circular array about a common central axis parallel to said second axis and intersecting said first axis, said platforms being radially equidistant from said central axis and angularly equispaced from one another therearound, said central axis being perpendicular to and intersecting said first axis.

5. The machine defined in claim 4, further comprising a central mold-receiving platform having a mold-receiving surface parallel ot the mold-receiving surface of the other platforms but closer than said other platforms to said first axis, said auxiliary drive means being connected to said central platform.

6. The machine defined in claim 5 wherein said other platforms each have a driven wheel, said driven wheels lying in a common plane, said second drive means including an endless elongated member passing around all of said wheels.

7. The machine defined in claim 1 wherein said drive means includes a shaft rotatably mounted on said frame and journaled about an axis parallel to said second axes, said platforms being angularly spaced about said central axis, a sun gear on said shaft and respective planetary gears connected to said platforms, and a respective idler gear meshing with each of said planetary gears and said sun gear.

References Cited

UNITED STATES PATENTS

| | | | |
|---|---|---|---|
| 1,812,242 | 6/1931 | Jensen | 18—26 A |
| 2,681,472 | 6/1954 | Rempel | 18—26 A |
| 2,967,329 | 1/1961 | Friedland et al. | 18—26 AX |
| 3,072,965 | 1/1963 | Miller | 18—26 A |
| 3,381,631 | 5/1968 | Hornlein et al. | 18—26 A |
| 3,416,193 | 12/1968 | Freeborn | 18—26 A |
| 3,432,581 | 3/1969 | Rosen | 18—26 A |
| 3,454,988 | 7/1969 | Cremer | 18—26 A |
| 3,492,307 | 1/1970 | Hoskinson | 18—26 A |

J. SPENCER OVERHOLSER, Primary Examiner

R. L. SPICER, JR., Assistant Examiner

U.S. Cl. X.R.

264—311